UNITED STATES PATENT OFFICE.

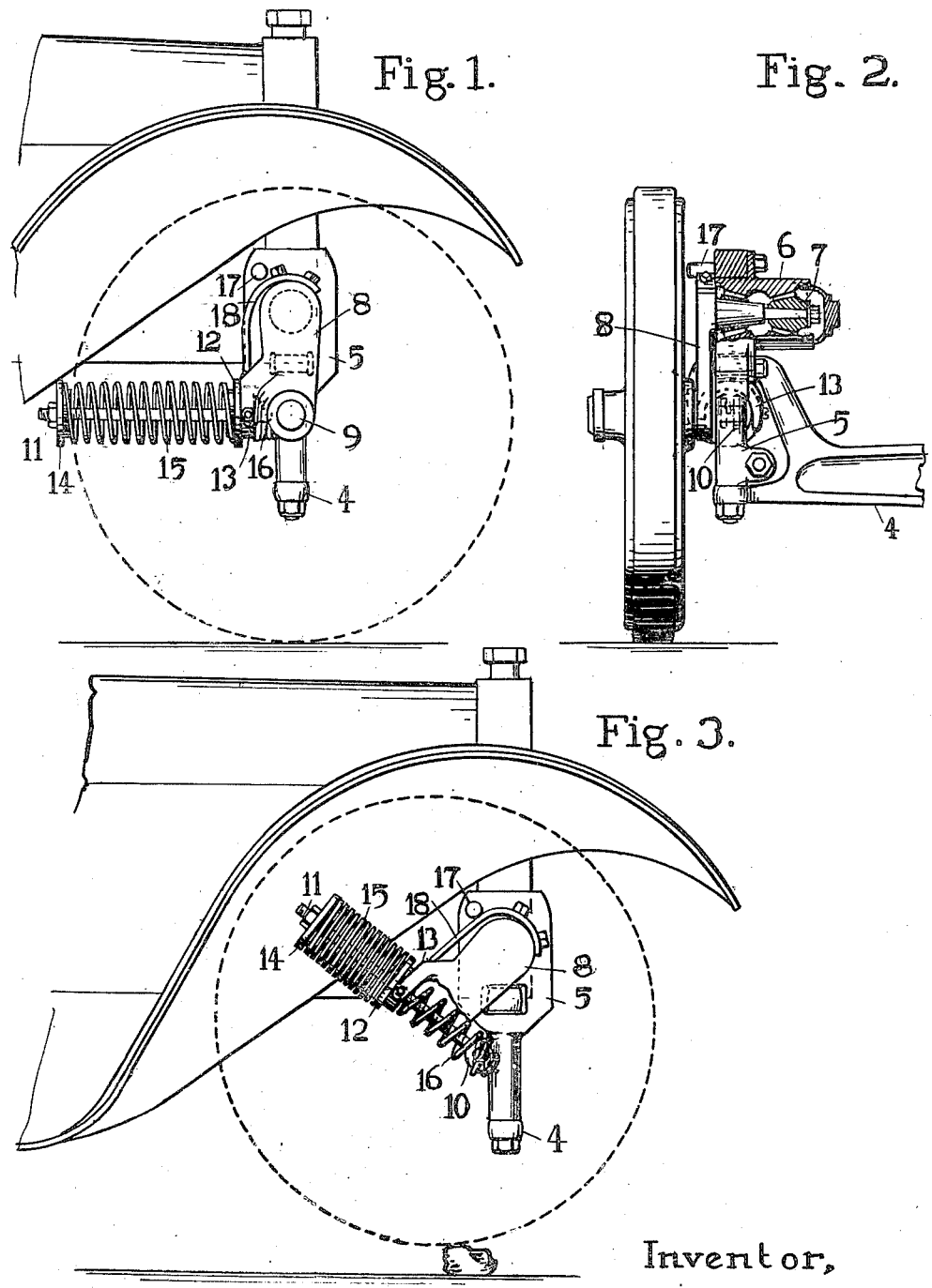

HUGH EWING, OF COLUMBUS, OHIO.

SPRING-CONTROLLED VEHICLE-WHEEL LINK.

1,316,565.	Specification of Letters Patent.	Patented Sept. 23, 1919.

Application filed November 8, 1917. Serial No. 200,892.

*To all whom it may concern:*

Be it known that I, HUGH EWING, a citizen of the United States of America, and a resident of the city of Columbus, county of Franklin, and State of Ohio, have invented certain new and useful Improvements in Spring-Controlled Vehicle-Wheel Links, of which the following is a specification.

This invention is an improvement upon the invention set forth in Letters Patent of the United States No. 951,000, granted to me March 1, 1910, wherein a supporting link is interposed between the wheel-axle and the body of the vehicle, and the link is pivoted substantially vertically over the wheel-axle and normally maintained by a main spring in a vertical position.

A specific object of this invention is to provide a stop for limiting the deflection of the link from the vertical at substantially forty-five degrees and to bring into action an angular limit buffer spring when the link nearly reaches this angle.

A further object is to secure maximum sensitiveness in the action of the link by providing a balance spring opposing the main spring when the link is deflected and balancing the force of the main spring when the link is in a vertical position, and by making the line of action of these springs on the level of the wheel-axle.

A further object is to so locate these springs that the wheel may be placed close to the line of the steering knuckle whereby steering will be easier and leverage tending to wrench or break the parts will be lessened.

In the accompanying sheet of drawings which forms a part of this application—

Figure 1 is a side elevation showing the invention applied to the front wheel of an automobile;

Fig. 2 is a front elevation of the same, and

Fig. 3 is a side elevation of the mechanism operating to permit the wheel to pass over an obstruction.

An axletree 4 has a steering knuckle 5 hinged thereto as is usual in automobile construction. But the knuckle instead of directly carrying the wheel-axle is extended above the upper pivot of the axletree and a horizontally disposed bearing 6 is bolted thereto. A trunnion 7 of a supporting link 8 is pivoted in this bearing and the lower end of this link carries an axle 9 on which the running wheel turns. This axle is substantially parallel with the trunnion, and the axis of the trunnion is normally substantially over the axis of the running wheel axis. To the rear of the steering knuckle is a forked eye 10 preferably on a level with the wheel axle in which the end of a rod 11 is pivoted. This rod slides through a spring-head 12 which is pivoted in a fork 13 carried by the supporting link. An adjustable spring-head 14 screws on the end of the rod. Between the two heads is a main spring 15 which opposes the rearward movement of the link throughout its angular movement. A balance spring 16 lies between the head 12 in the link-fork 13 and the steering knuckle. This spring opposes the main spring and renders the action more sensitive and this spring is light enough to be sufficiently overcome by the main spring to bring the link to a vertical position. The link can swing but little forward of the vertical position, by reason of the fork coming in contact with the knuckle. Rearward movement of the link beyond about forty-five degrees is prevented by a stop pin 17 which projects from the knuckle. A rearward limiting buffer spring 18 is a strap spring one end of which is bolted to the upper end of the link and the other end of which bears against the lower part of the link. The stop pin comes in contact with the middle of the strap spring just before the link reaches the limit of rearward movement.

When, in moving forward rapidly the wheel strikes an obstruction, as a stone, that wheel is stopped momentarily in its forward movement, but, by reason of the swinging link connection, the vehicle-body continues forward unchecked while the wheel displaces with respect to the body first rearwardly and horizontally and then, following a curved path, rises and passes over the obstruction. This action is opposed by the main spring; but this is minimized by the balance spring which balances the main spring, keeps it in equilibrium, and thus renders its action more uniform and sensitive. As the link nears the limit of its rearward movement the stiff rearward limiting buffer spring is brought into contact with the stop pin and checks the rearward swing of the link so that it will not strike a blow. Being a very stiff spring, it coöperates with the main spring to promptly start the link back to its normal vertical position after it has swung back in passing over an obstruction.

The forty-five degree stop.

In previous constructions the link was allowed to go back ninety degrees, to a horizontal position, in which position the spring supported the entire weight resting on that wheel. When checked at forty-five degrees, as in the present construction, the spring sustains only half the weight, the balance being carried by the link. The former construction, while it allowed greater action, necessitated a heavy stiff spring, while in the present construction a light and more sensitive spring suffices, thus increasing its sensitiveness and efficiency to an enormous extent, and causing it to respond to much smaller obstructions.

The balance spring.

In previous constructions a buffer spring was used whose sole object was to prevent forcible impact on the return to the vertical position. The balance spring is much longer and stronger than the buffer spring of previous constructions, and it is capable not merely of checking the rebound but also of following up and balancing the main spring, keeping it in equilibrium, and thus rendering its action much more sensitive to small obstructions.

What I claim, is—

1. In a vehicle, the combination of a wheel-axle, a body, a supporting link for the body carried upon the wheel-axle said link being pivoted substantially vertically over the wheel-axle, a main spring for normally maintaining the link in its vertical position, and a stop for limiting the rearward swing of the link to substantially forty-five degrees, substantially as described.

2. In a vehicle the combination of a wheel-axle, a body, a supporting link for the body carried upon the wheel-axle said link being pivoted substantially vertically over the wheel-axle, a main spring for normally maintaining the link in its vertical position, a stop for limiting the rearward swing of the link, and a rearward limiting buffer spring which is interposed between the link and the stop just before the link reaches the rearward limit of its movement, substantially as described.

3. In a vehicle the combination of a wheel-axle, a body, a supporting link for the body carried upon the wheel-axle said link being pivoted substantially vertically over the wheel-axle, a main spring for normally maintaining the link in its vertical position, a stop for limiting the rearward swing of the link, and a rearward limiting buffer spring which checks the rearward movement of the link at substantially forty-five degrees, substantially as described.

4. In a vehicle, the combination of a wheel-axle, a body, a supporting link for the body carried upon the wheel-axle said link being pivoted substantially vertically over the wheel-axle, a main spring for normally maintaining the link in its vertical position, and a balance spring opposed to the main spring when the link is deflected and balancing the force of the main spring when the link is in a vertical position, substantially as described.

5. In an automobile, the combination of a wheel-axle, a steering knuckle, a supporting link for the body carried upon the wheel-axle said link being pivoted substantially vertically over the wheel-axle, and a main spring for normally maintaining the link in its vertical position located directly in the rear of the hinge of the steering knuckle, substantially as described.

6. In an automobile, the combination of a wheel-axle, a steering knuckle, a supporting link for the body carried upon the wheel-axle said link being pivoted substantially vertically over the wheel-axle, and a main spring for normally maintaining the link in its vertical position supported by a rod attached to the hinge of the steering knuckle, substantially as described.

7. In an automobile, the combination of a wheel-axle, a steering knuckle, a supporting link for the body carried upon the wheel-axle said link being pivoted substantially vertically over the wheel-axle, a main spring for normally maintaining the link in its vertical position, and a balance spring opposed to the main spring, both of said springs being located directly in the rear of the hinge of the steering knuckle, substantially as described.

8. In an automobile, the combination of a wheel-axle, a steering knuckle, a supporting link for the body carried upon the wheel-axle said link being pivoted substantially vertically over the wheel-axle, a main spring for normally maintaining the link in its vertical position, and a balance spring opposed to the main spring, both of said springs being located directly in the rear of the hinge of the steering knuckle and with their line of action at the level of the wheel-axle, substantially as described.

Signed at Columbus, Ohio, this 5th day of November, 1917.

HUGH EWING.